US012548992B2

United States Patent
Jeong et al.

(10) Patent No.: US 12,548,992 B2
(45) Date of Patent: Feb. 10, 2026

(54) BUSDUCT AND BUSDUCT SYSTEM HAVING THE SAME

(71) Applicant: LS CABLE & SYSTEM LTD., Anyang-si (KR)

(72) Inventors: Geun Young Jeong, Daegu (KR); Min Woo Lee, Anyang-si (KR); Soo Gwan Kim, Daegu (KR); Won Seok Kim, Gumi-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 179 days.

(21) Appl. No.: 18/579,726

(22) PCT Filed: Jul. 14, 2022

(86) PCT No.: PCT/KR2022/010266
§ 371 (c)(1),
(2) Date: Jan. 16, 2024

(87) PCT Pub. No.: WO2023/003270
PCT Pub. Date: Jan. 26, 2023

(65) Prior Publication Data
US 2024/0322547 A1    Sep. 26, 2024

(30) Foreign Application Priority Data

Jul. 19, 2021 (KR) .................. 10-2021-0094379
Jul. 13, 2022 (KR) .................. 10-2022-0086489

(51) Int. Cl.
H02G 5/08    (2006.01)
H01R 25/16   (2006.01)

(52) U.S. Cl.
CPC ............. *H02G 5/08* (2013.01); *H01R 25/162* (2013.01)

(58) Field of Classification Search
CPC .................................. C08L 27/06; G06F 1/26
See application file for complete search history.

(56) References Cited

U.S. PATENT DOCUMENTS

| 7,819,676 | B1 | 10/2010 | Cardoso et al. | |
| 2024/0322547 | A1* | 9/2024 | Jeong | H02G 5/06 |
| 2025/0293501 | A1* | 9/2025 | Jeong | H02G 5/08 |

FOREIGN PATENT DOCUMENTS

| CN | 108847640 | A | * | 11/2018 | ............. | H02G 5/06 |
| CN | 110165623 | A | * | 8/2019 | ............. | H02G 5/08 |
| CN | 113949021 | A | * | 1/2022 | ............. | H02G 5/06 |
| JP | 5281433 | B2 | | 9/2013 | | |
| KR | 940006452 | Y1 | * | 9/1994 | ............. | H02G 5/08 |
| KR | 20050107148 | A | * | 11/2005 | | |

(Continued)

OTHER PUBLICATIONS

Original and Translation of KR20210094416 (Year: 2021).*
(Continued)

*Primary Examiner* — Timothy J. Dole
*Assistant Examiner* — Muhammed Azam
(74) *Attorney, Agent, or Firm* — K&L Gates LLP

(57) ABSTRACT

A bus duct as may be installed in a data center or the like to supply power to a data server or the like, and a bus duct system provided with the same, is provided with branch boxes for branching that may be conveniently installed at necessary locations to supply power to power-consuming equipment with reliable connections for power delivery.

20 Claims, 8 Drawing Sheets

(56) References Cited

FOREIGN PATENT DOCUMENTS

| KR | 20130074324 A | | 7/2013 | |
|----|---------------|---|--------|---|
| KR | 20140086099 A | * | 7/2014 | ............... H02G 5/06 |
| KR | 20140102406 A | | 8/2014 | |
| KR | 102159296 B1 | | 9/2020 | |
| KR | 20230013626 A | * | 1/2023 | .............. C08L 27/06 |
| KR | 20240145905 A | * | 10/2024 | ......... H01R 13/2407 |
| KR | 20240146336 A | * | 10/2024 | ............. H02G 13/40 |
| KR | 20240148111 A | * | 10/2024 | ............... H02G 5/06 |

OTHER PUBLICATIONS

International Search Report for related International Application No. PCT/KR2022/010266; action dated Jan. 26, 2023; (2 pages).
Written Opinion for related International Application No. PCT/KR2022/010266; action dated Jan. 26, 2023; (3 pages).

* cited by examiner

BUSDUCT AND BUSDUCT SYSTEM HAVING THE SAME

CROSS-REFERENCE TO RELATED APPLICATIONS

The present application is a National Stage of International Application No. PCT/KR2022/010266 filed on Jul. 14, 2022, which claims the benefit of Korean Patent Application No. 10-2021-0094379, filed on Jul. 19, 2021, and Korean Patent Application No. 10-2022-0086489, filed Jul. 13, 2022, filed with the Korean Intellectual Property Office, the entire contents of each hereby incorporated by reference.

FIELD

The present disclosure relates to a bus duct and a bus duct system provided with the same. More specifically, the present disclosure relates to a bus duct installed in a data center or the like to supply power to a data server or the like, and a bus duct system provided with the same, in which branch boxes for branching may be conveniently installed at necessary locations to supply power to power-consuming equipment, the reliability of connection of the bus duct to the branch boxes for branching may be improved, and the durability or reliability of a cover member, which is provided on the bus duct to prevent the inside of the bus duct from being exposed, may be improved even though the branch box is frequently mounted and detached or the location of the branch box is frequently changed.

BACKGROUND

Recently, the number and scales of Internet data centers (IDCs) have increased as the proliferation and use of the Internet have expanded.

The Internet data centers are spaces in which maintenance of data servers or the like is consistently performed, and the number of data consumed by the Internet data center is so large that it is incomparable to that of a typical office building.

In addition, there are frequent operations to change locations of, replace, or additionally install data servers or the like, and processes of constructing power lines are essentially involved in supplying power to the data servers when the above-mentioned operations are performed.

Even in the related art, a technology is used in which a bus duct is applied to a building, the bus duct is connected to a particular space, a branch box is mounted on the bus duct, and a plurality of power cables branching through the branch box is disposed along a floor of a server space and connected to power-consuming facilities, such as data servers, to supply power to the power-consuming facilities.

However, the processes of changing or adding connection locations of the power cables are not workable when the locations of the data servers are changed or newly added. In addition, the plurality of power cables disposed on the floor or the like occupies a space, which degrades spatial utilization and aesthetic appearances.

SUMMARY

An object of the present disclosure is to provide a bus duct installed in a data center or the like to supply power to a data server or the like, and a bus duct system provided with the same, in which branch boxes for branching may be conveniently installed at necessary locations to supply power to power-consuming equipment, the reliability of connection of the bus duct to the branch boxes for branching may be improved, and the durability or reliability of a cover member, which is provided on the bus duct to prevent the inside of the bus duct from being exposed, may be improved even though the branch box is frequently mounted and detached or the location of the branch box is frequently changed.

In order to achieve the above-mentioned object, the present disclosure provides a bus duct including: an enclosure made of a metallic material; a plurality of pairs of busbars disposed in pairs in parallel with one another in a longitudinal direction of the enclosure and spaced apart from one another; a plurality of insulation members configured to mount the pairs of busbars in an insulated state in the enclosure; and a plurality of pairs of cover members mounted on a lower portion of the enclosure and configured to prevent exposure of the busbars, in which the pairs of cover members are mounted on the enclosure to block connection ports of the bus duct into which connection conductors of a branch box are inserted, and the pairs of cover members are deformed inward to expose the connection ports when the connection conductors of the branch box enter the connection ports, in which the cover member includes a mounting portion mounted on the enclosure, a connection portion extending from the mounting portion toward a lower side of the connection port, and a plurality of blocking portions branching off from the connection portion in a direction toward the connection port, and in which the blocking portions of the cover member include an outer blocking portion extending from the connection portion, and an inner blocking portion extending from the connection portion toward the inside of the bus duct further than the outer blocking portion.

In addition, the outer blocking portion may further extend from the connection portion in a horizontal direction and then be bent in the direction toward the connection port.

Further, the mounting portion, the connection portion, the inner blocking portion, and the outer blocking portion of the cover member may be integrated by extrusion.

In this case, a physical property of a material of the outer blocking portion may be different from a physical property of a material of the inner blocking portion.

In this case, the outer blocking portion may have tensile strength of 550 to 610 kg/cm$^2$, specific gravity of 1.35 to 1.55 g/cm$^3$, and an extension ratio of 140 to 160%.

Further, the inner blocking portion may have tensile strength of 170 to 210 kg/cm$^2$, specific gravity of 1.13 to 1.33 g/cm$^3$, and an extension ratio of 400 to 450%.

In addition, the outer blocking portion may be made of a hard PVC material, and the inner blocking portion may be made of a soft PVC material.

Further, a thickness of the outer blocking portion may be larger than a thickness of the inner blocking portion.

In this case, the outer blocking portion and the inner blocking portion may each have a thickness of 0.5 to 1.0 millimeters (mm).

In this case, the inner blocking portion may have a thickness of 0.5 to 0.8 millimeters (mm), and the outer blocking portion may have a thickness of 0.8 to 1.0 millimeters (mm).

Further, the outer blocking portion may be shorter than the inner blocking portion.

In addition, a length of the outer blocking portion may be 0.3 to 0.5 times a length of the inner blocking portion.

Further, in a state in which the connection conductors of the plurality of branch boxes are not inserted into the connection ports, respectively, the outer blocking portion of the cover member may not be in contact with the opposite outer blocking portion, and a predetermined interval between the outer blocking portions may be maintained.

In this case, the predetermined interval between the outer blocking portions may be smaller than a thickness of the connection conductor of the branch box.

In this case, in a state in which the connection conductors of the plurality of branch boxes are not inserted into the connection ports, respectively, ends of the inner blocking portions of the pair of cover members may be in contact with each other and block the connection port.

Further, the inner blocking portion and the outer blocking portion may sequentially branch off from the connection portion at an angle of about 40 to 50 degrees with respect to a horizontal reference line.

In addition, the mounting portion of the cover member may be mounted by being slidingly inserted into a slot formed in the enclosure.

Further, the mounting portion of the cover member may include a protrusion branching off from the connection portion in a direction different from a direction of the connection portion so that the mounting portion does not rotate in a state in which the mounting portion is mounted in the slot of the enclosure.

In this case, the connection portion of the cover member may have a shape extending to be inclined downward from the mounting portion and then bent in a horizontal direction.

In this case, two opposite surfaces of each of the connection conductors of the plurality of branch boxes may sequentially come into contact with the outer blocking portion and the inner blocking portion, which constitute the blocking portions of the cover member, during a process in which the connection conductor is inserted into the connection port.

Further, the bus duct may further include: a plurality of pairs of elastic contact members mounted on the pairs of busbars inserted into the insulation members.

In addition, the insulation member may include: a fixing portion mounted by being inserted into an insertion slot formed in the enclosure; a mounting portion branching off downward from the fixing portion and configured such that the pair of busbars with the elastic contact members interposed therebetween is mounted inside the mounting portion; and an insertion portion provided at a lower end of the mounting portion and configured to support a lower end of the busbar mounted on the mounting portion, the insertion portion being configured such that the connection conductor of the branch box is inserted into the insertion portion.

Further, the insulation members may have hook-shaped stepped portions formed on boundaries between the pair of branching mounting portions and the insertion portions to support the lower ends of the pair of busbars.

In this case, the insertion portion of the insulation member may have an inclined surface to guide a route when the connection conductor of the branch box is inserted.

In this case, the plurality of pairs of elastic contact members may be provided to surround the pairs of busbars in the connection ports.

Further, an outer end of the elastic contact member may be mounted to surround an outer peripheral surface of a lower portion of the busbar and be in close contact with the insulation member and the busbar between the insulation member and the busbar, and an inner end of the elastic contact member may have a shape that defines an elastic contact portion, which is raised in a direction toward the opposite busbar, and then is in contact with an inner peripheral surface of the busbar.

In addition, the elastic contact portions of the pair of elastic contact members may be disposed at corresponding locations while facing each other.

In addition, in order to achieve the above-mentioned object, the present disclosure provides a bus duct system including: the above-mentioned bus duct; and a branch box including a housing, a plurality of connection conductors connected and inserted into the connection ports of the bus duct and protruding upward from the housing, and at least one plug connection unit on which a plug of a power cable for distributing power, which is supplied through the connection conductors, and supplying the power to a power-consuming facility is mounted.

According to the bus duct and the bus duct system provided with the same according to the present disclosure, the branch box may be installed in the data center or the like to supply power to the data server or the like and conveniently implement branching at a necessary location, thereby supplying power to the power-consuming equipment.

In addition, according to the bus duct and the bus duct system provided with the same according to the present disclosure, the cover member is maintained in shape without being deformed even when the branch box is attached to or detached from the bus duct, and the structure of the cover member is improved so that the inside of the bus duct is not exposed. Therefore, the method of improving the reliability and durability of the cover member may minimize the introduction of foreign substances into the connection port and a risk of a safety accident.

In addition, according to the bus duct and the bus duct system provided with the same according to the present disclosure, the elastic contact members may be interposed between the pair of busbars constituting the busbars of the bus duct, thereby improving the reliability and durability related to the connection between the connection conductor of the branch box and the busbars.

DETAILED DESCRIPTION

Figure 1:
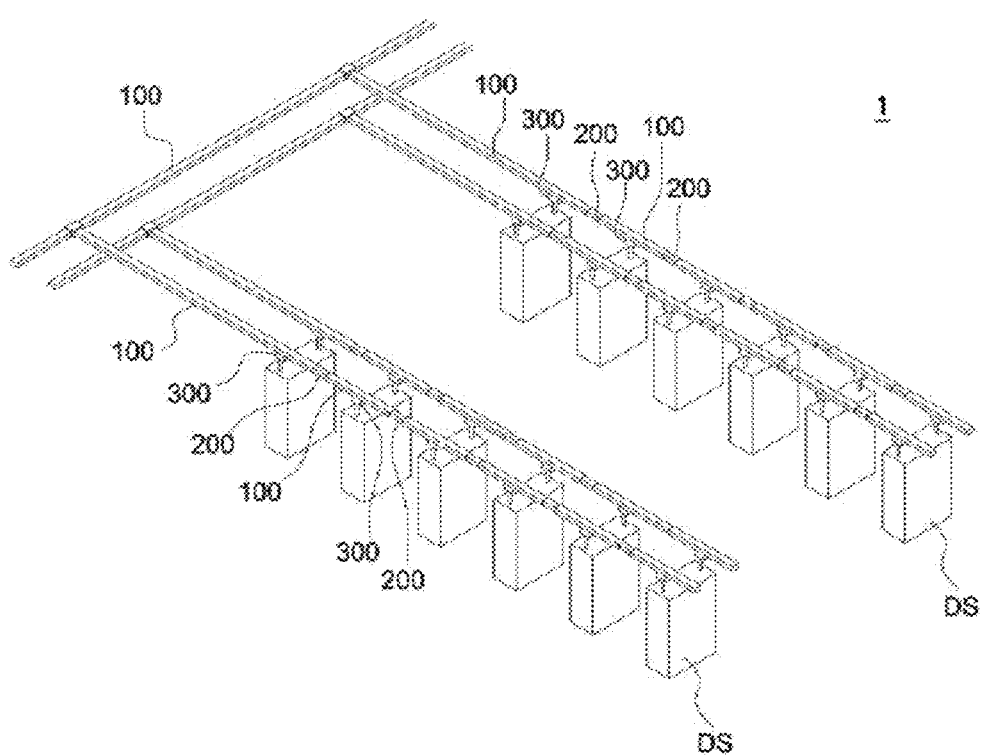
FIG. 1 is a schematic view illustrating a bus duct system according to the present disclosure.

Hereinafter, exemplary embodiments of the present disclosure will be described in detail with reference to the accompanying drawings. However, the present disclosure is not limited to the exemplary embodiments to be described below and may be specified as other aspects. On the contrary, the embodiments introduced herein are provided to make the disclosed content thorough and complete, and sufficiently transfer the spirit of the present disclosure to those skilled in the art. Like reference numerals indicate like constituent elements throughout the specification.

FIG. 1 is a schematic view illustrating a bus duct system 1 according to the present disclosure.

The bus duct system 1 according to the present disclosure may be a power system installed in the Internet data center (IDC) or the like.

The bus duct system 1 according to the present disclosure may be mounted on a ceiling or the like of a server installation space in a data center and connected to a plurality of bus ducts 100 by means of connection kit 200 to construct a power grid to a necessary location in the server installation space.

The power grid implemented by the bus duct system 1 may be connected to data servers DS through power cables equipped with plugs without being connected directly to the data servers DS.

Therefore, in order to supply power to a particular server, the plug of the power cable may be connected to a branch box 300, which is close to the sever among the branch boxes mounted on the bus duct 100, such that the server may be supplied with power.

In addition, according to the bus duct 100 and the bus duct system 1 provided with the same according to the present disclosure, the location of the connection between the bus duct 100 and the branch box 300 is not limited, and the bus duct 100 and the branch box 300 may be connected at a necessary location. Therefore, it is possible to minimize a length of the power cable for connecting the branch box 300 to the server, which is a power-consuming facility, and to easily change a location of the branch box 300, as necessary.

In order to easily change the location of the connection of the branch box 300 to the bus duct 100 as necessary, the structure of the bus duct 100 needs to be connected to a connection conductor 330 of the branch box 300 regardless of the location, the structure of the bus duct 100 needs to be easily connected to the connection conductor 330, and the connection reliability needs to be ensured in the connected state.

Figure 2:
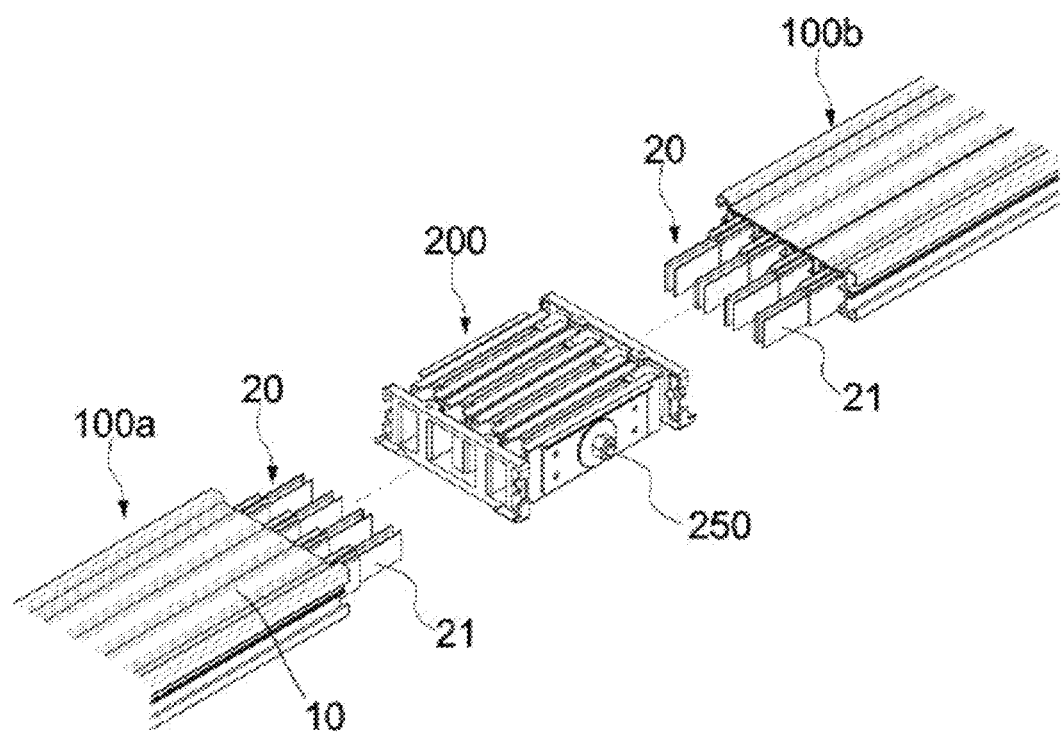
FIG. 2 is a view illustrating a pair of bus ducts and a connection kit that constitute a bus duct system according to the present disclosure.
Figure 3:
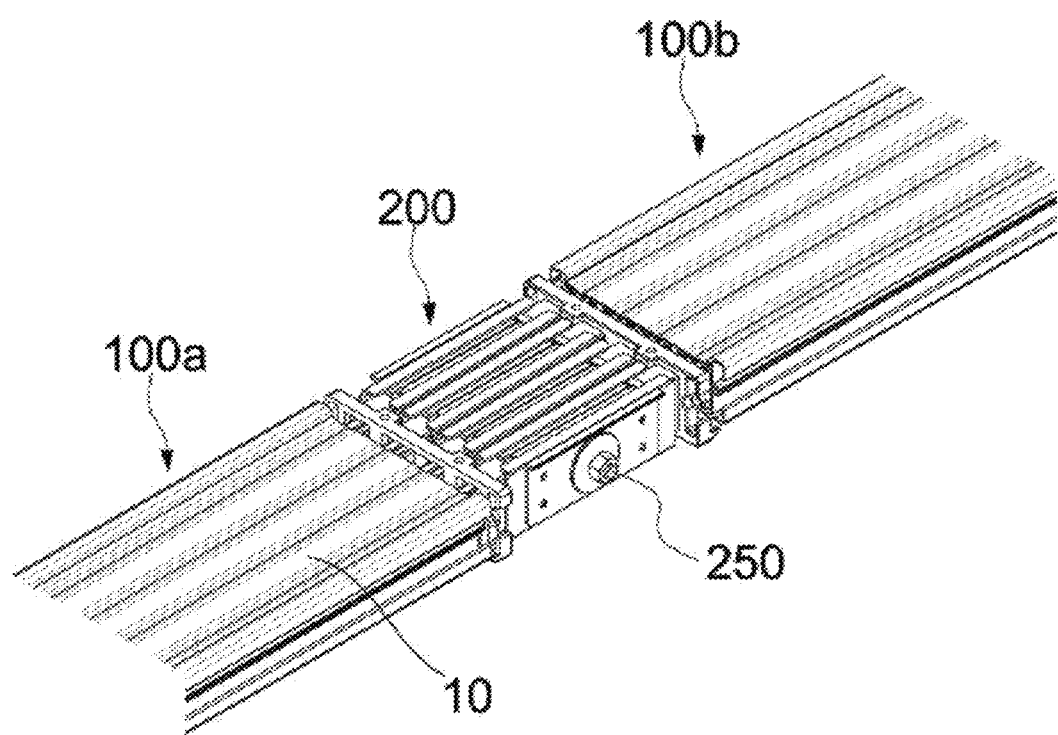
FIG. 3 is a view illustrating the pair of bus ducts and the connection kit, which constitute the bus duct system according to the present disclosure, and illustrating a state in which the pair of bus ducts are completely connected by the connection kit.

FIG. 2 illustrates the pair of bus ducts 100 and the connection kit 200 that constitute the bus duct system 1 according to the present disclosure, and FIG. 3 illustrates a state in which the pair of bus ducts 100, which constitute the bus duct system 1 according to the present disclosure, are completely connected by means of the connection kit 200.

As illustrated in FIGS. 2 and 3, bus ducts 100a and 100b for supplying power may be manufactured for each unit length and connected by means of the connection kit 200. Therefore, the bus ducts 100a and 100b have structures provided at two opposite ends thereof and configured to be connected to the connection kit 200.

The bus ducts 100a and 100b illustrated in FIGS. 2 and 3 may each include a plurality of busbars 21 disposed in parallel with one another, and an enclosure 10 configured to accommodate the busbars 21.

The busbar 21 may be made of a conductor such as copper or aluminum. The busbar 21 is accommodated in the enclosure and protected in a state of being isolated from the outside.

The connection kit 200 is equipped with current application plates (not illustrated) configured to be electrically connected to the busbars 21 for respective phases of the bus duct 100, such that the connection kit 200 may be used as a connection means that connects the bus ducts 100 by applying the current in a state in which the busbars 21 for respective phases are insulated from each other.

Further, the plurality of pairs of busbars 21, which constitutes the bus ducts 100a and 100b of the present disclosure, may be provided for respective phases so that the plurality of pairs of busbars 21 is mounted with elastic contact members 40 interposed therebetween and described below and the plate-shaped connection conductors 330 (see FIG. 5) of the branch box 300 to be described below are mounted by being inserted between the plurality of pairs of busbars 21.

Ends of the busbars 21, which constitute the bus ducts 100a and 100b, may constitute a connection part 20 of the bus duct and be connected by being inserted into the connection kit 200.

Therefore, the current application plate of the connection kit 200 and the connection conductor 330 of the branch box 300, which will be described below, may be configured as plate-shaped conductors configured to be inserted between a pair of conductors that constitutes the busbars 21 for respective phases of the bus duct 100.

Further, as illustrated in FIG. 3, in case that the pair of bus ducts 100a and 100b is connected by means of the connection kit 200, a fastening bolt 250, which constitutes the connection kit 200, is tightened, such that the bus ducts 100 are completely connected in a longitudinal direction, and a power transmission length may be increased.

That is, the pair of bus ducts 100a and 100b is connected to each other in a straight direction by the connection kit 200 illustrated in FIGS. 2 and 3, such that the length may be increased.

Figure 4:
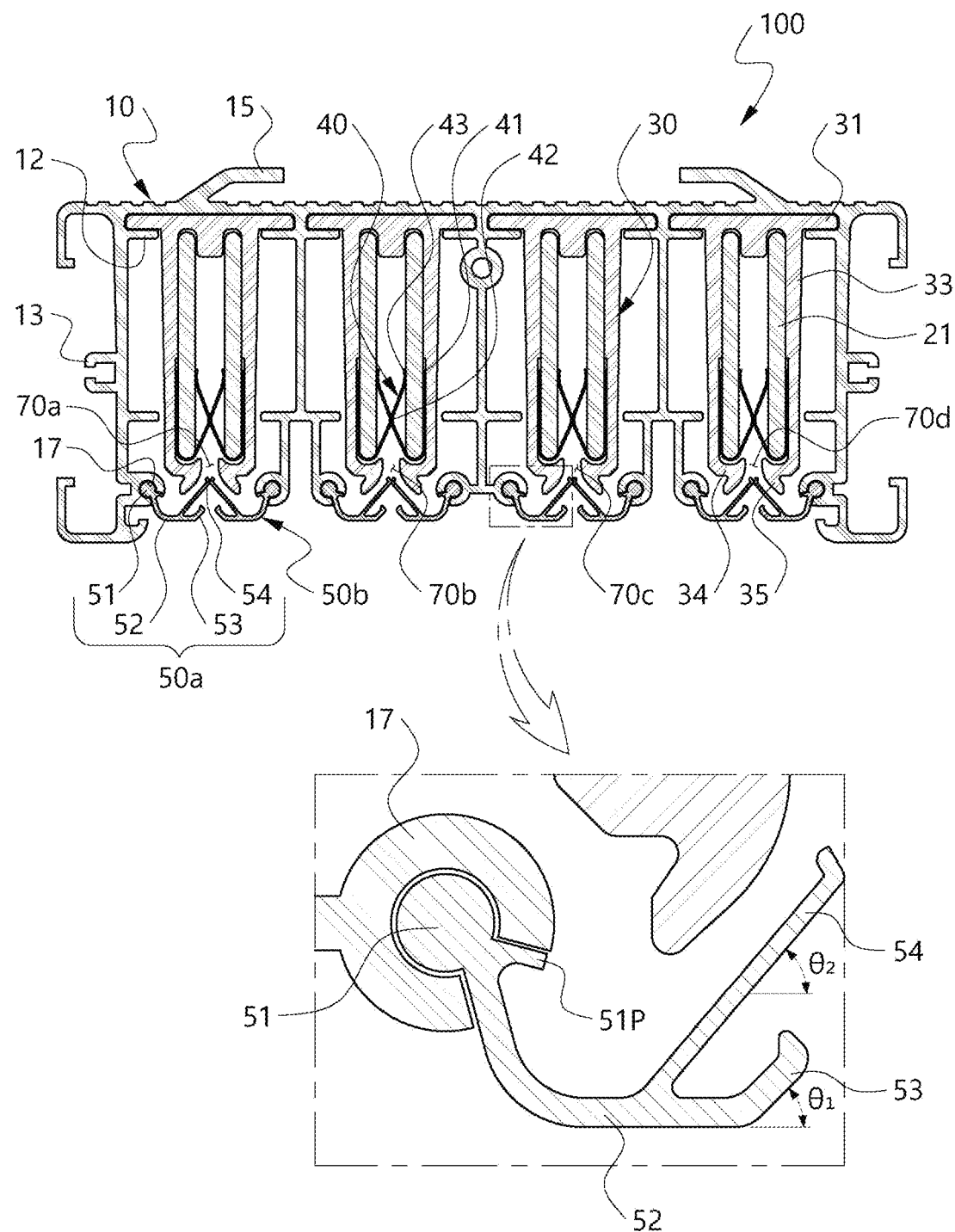
FIG. 4 is a cross-sectional view of one embodiment of the bus duct of the present disclosure.

FIG. 4 is a cross-sectional view of one embodiment of the bus duct 100 of the present disclosure.

The bus duct 100 according to the present disclosure may include: the enclosure 10 made of a metallic material; the plurality of pairs of busbars 21 disposed in pairs in parallel with the longitudinal direction of the enclosure and spaced apart from one another; a plurality of pairs of insulation members 30 configured to mount the plurality of pairs of busbars in an insulated state in the enclosure; the plurality of pairs of elastic contact members 40 each mounted between each of the pairs of busbars accommodated in the insulation member; and a plurality of pairs of cover members 50a-50b (generally or collectively, cover members 50) mounted at a lower side of the enclosure and prevent the exposure of the busbars and the elastic contact members 40, in which each of the pairs of cover members 50 is mounted on the enclosure to block each of connection ports into which the connection conductors of the branch box mounted on the bus duct are inserted and connected, in which when the connection conductor of the branch box enters the connection port, the pair of cover member is deformed inward to expose the connection port, and in which the cover member 50 includes a mounting portion 51 mounted on the enclosure, a connection portion 52 extending from the mounting portion 51 toward a lower side of the connection port, and a plurality of blocking portions branching off from the connection portion 52 in a direction toward the connection port.

FIG. 4 illustrates an example in which the bus duct 100 has the four busbars 21 for supplying R, S, T, and N-phase power and has the four connection ports 70a, 70b, 70c, and 70d provided at the lower side of the bus duct 100 so that the connection conductors 330 of the branch box 300 for distributing power are connected and inserted into the elastic contact members 40 through the four connection ports 70a, 70b, 70c, and 70d. However, the number of busbars 21 may be three to supply R, S, and T-phase power, or the number of busbars 21 may be five to supply R, S, T, N, and N-phase power. Therefore, the number of connection ports 70 may be increased or decreased.

As described above, the busbars 21, which constitute the bus duct 100 according to the present disclosure, may be configured as the pair of conductors disposed in parallel with each other and spaced apart from each other. The elastic contact member 40 is provided between the pair of conductors that constitutes each of the busbars 21 for respective phases, such that the electrical connection reliability between the connection conductors 330 and the busbars 21 may be improved when the connection conductors 330 of the branch box 300 are connected to the busbars 21.

The enclosure 10, which constitutes the bus duct 100, may be made of a metallic material, such as aluminum, and have the insulation members 30 in order to mount the conductors, which constitute the busbars 21, in an insulated state in the enclosure 10.

A cable seating part 13 for mounting a communication or control cable may be provided on a lateral surface of the enclosure. A mounting frame 15 or the like, which is configured to be mounted on a ceiling structure in a bus duct installation space, may be provided on the lateral surface of the enclosure.

As illustrated in FIG. 4, the insulation member 30 may include a fixing portion 31 mounted by being inserted into an insertion slot formed in the enclosure 10, a mounting portion 33 branching off downward from the fixing portion 31 so that the pair of busbars 21 with the elastic contact member 40 interposed therebetween is mounted inside the mounting portion 33, and an insertion portion 35 provided at a lower end of the mounting portion 33 and configured to support a lower end of the busbar 21 mounted on the mounting portion 33, the insertion portion 35 being configured such that the connection conductor 330 of the branch box 300 is inserted into the insertion portion 35.

The fixing portion 31 is configured to be mounted by being inserted into the insertion slot 12 formed in the enclosure 10, and the fixing portion 31 may be provided in the form of a board disposed in a horizontal direction.

The two mounting portions 33 may branch off downward from the fixing portions 31 and be mounted in parallel with each other so that the pair of conductors, which constitutes the busbars 21, is disposed inside the mounting portions 33 so as to face each other and spaced apart from each other. A cross-sectional shape of the insulation members 30 may be a "π" shape, as a whole, by the shapes of the fixing portions 31 and the shapes of the mounting portions 33. In addition, a protrusion may be additionally provided on a central portion between upper ends of the insulation members 30 to stably support the pair of conductors, together with the mounting portions 33.

The insulation member 30 may be manufactured by extrusion. A material of the insulation member 30 may be polycarbonate (PC) that has insulation having a sufficient insulation breakdown voltage, heat resistance, high tensile strength, impact resistance, and excellent thermal processability.

Further, as illustrated in FIG. 4, the insulation members 30 have hook-shaped stepped portions 34 formed on boundaries between the insertion portions 35 and the pair of mounting portions 33 branching off from the fixing portions 31 to support the lower ends of the pair of conductors that constitutes the busbars 21 mounted on the mounting portions 33. In addition, a shape of the insertion portion 35 may be configured as a curved shape corresponding to the shape of the conductor so that the insertion portions 35 may stably surround and hold the lower ends of the pair of conductors.

In addition, the insertion portion 35 of the insulation member 30 may have an inclined surface to guide a route when the connection conductor of the branch box is inserted.

The elastic contact member 40 may be provided between the pair of conductors that constitutes the busbars 21 for respective phases. The elastic contact member 40 is configured to be mounted on the busbar 21 and come into contact with the connection conductor 330 (see FIG. 5) of the branch box.

Specifically, as illustrated in FIG. 4, the pair of elastic contact members 40 may be provided inside the connection port and surround the pair of busbars 21.

An outer end 41 of the elastic contact member 40 is mounted to surround an outer peripheral surface of a lower portion of the busbar 21 and be in close contact with the mounting portion 33 of the insulation member 30 and the busbar 21 between the mounting portion 33 of the insulation member 30 and the busbar 21. An inner end 43 of the elastic contact member 40 may have a shape that defines an elastic contact portion 42, which is raised in a direction toward the opposite busbar, and then is in contact with an inner peripheral surface of the busbar.

The elastic contact member 40 may be made of metal, particularly brass. In addition, the raised elastic contact portions 42 of the pair of elastic contact members 40 may be in contact with each other when the connection conductor 330 of the branch box 300 is not inserted.

Figure 5:
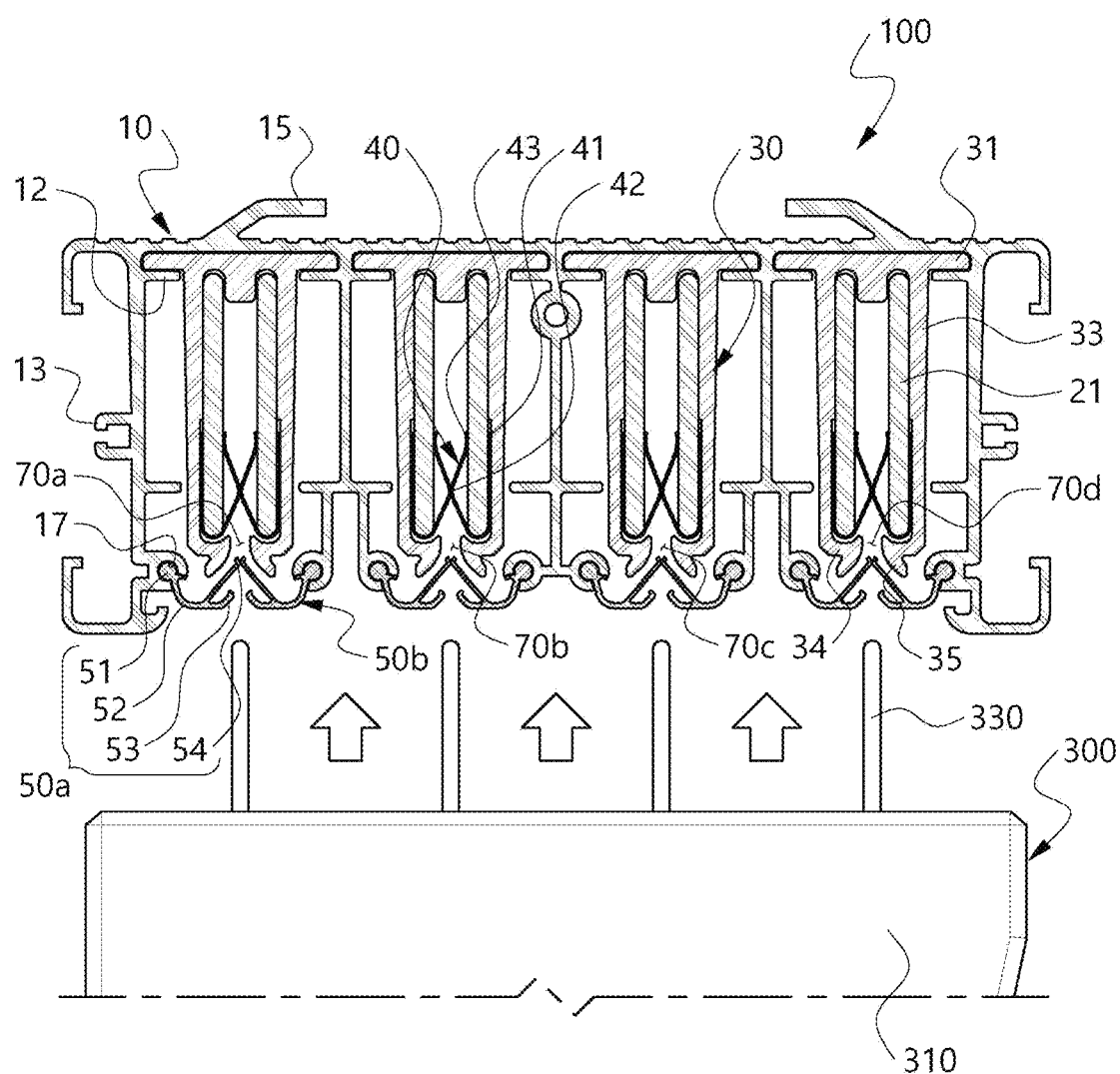
FIGS. 5 and 6 are views illustrating a cross-section during a process of connecting the bus duct and a branch box of the present disclosure.

In addition, as described below, in the state in which the connection conductor 330 of the branch box 300 illustrated in FIG. 5 is inserted, the elastic contact portions 42 of the elastic contact members 40 may be elastically in contact with two opposite surfaces of the connection conductor, thereby ensuring the reliability of the electrical connection.

Further, the bus duct 100 according to the present disclosure may include the cover members 50 mounted on a lower portion of the enclosure 10 and configured to prevent the internal configurations of the connection ports, such as the busbars 21 and the elastic contact members 40, from being exposed.

The cover member 50 may be provided to prevent a safety accident by preventing a finger or a working tool from entering the bus duct due to an operator's carelessness, minimize contamination or corrosion in the bus duct by preventing the introduction of dust or moisture, and prevent the busbar 21 and the elastic contact member from being visually exposed.

The cover member 50 may have a structure in which the blocking portion is deformed and the connection port 70 is opened and exposed when the connection conductor 330 of the branch box 300 enters the connection port 70.

Therefore, as illustrated in FIG. 4, the pairs of cover members 50*a* and 50*b* are mounted on the enclosure so as to block the connection ports, into which the connection conductors of the branch box are inserted and connected, in a state in which the branch box is not mounted. When the connection conductors of the branch box enter the connection ports, the pairs of cover members 50*a* and 50*b* are rotated inward so that the connection ports are exposed.

In this case, the pair of cover members 50 is disposed below the insertion portions 35 of the insulation members 30 and blocks the connection port 70. The cover member 50 may be made of resin such as plastic. The cover member 50 may be made of a flexible material so that the cover member 50 may be deformed, such as bent, when the connection conductor 330 of the branch box 300 is inserted into the connection port 70.

The cover member 50 may include the mounting portion 51 mounted on the enclosure, the connection portion 52 extending from the mounting portion 51 toward the lower side of the connection port, and the plurality of blocking portions 53 and 54 branching off from the connection portion 52 in the direction toward the lower side of the connection port.

Further, the connection ports 70 of the bus duct 100, into which the connection conductors 330 of the branch box 300 are inserted, may be provided in the entire region in the longitudinal direction of the bus duct 100.

That is, as illustrated in FIG. 4, when the branch box 300 is mounted at a necessary location in case that the cover members 50 are installed in the entire region of the lower portion of the bus duct 100, the connection conductors 330 of the branch box 300 are introduced between the pairs of cover members 50 and rotate the cover members 50 to expose the connection ports, such that the connection conductors 330 may enter the connection ports and come into contact with the busbars.

In the embodiment illustrated in FIG. 4, the plurality of blocking portions includes two blocking portions, i.e., the inner blocking portion 54 and the outer blocking portion 53. However, the number of blocking portions may be increased.

The cover member 50 may include the plurality of branching blocking portions. As illustrated in FIG. 4, the blocking portions may include the outer blocking portion 53 branching off from the connection portion 52 toward the lower side of the connection port in an outward diagonal direction, i.e., at an angle θ of about 40 to 50 degrees with respect to a horizontal reference line, and the inner blocking portion 54 branching off from the connection portion 52 toward the lower side of the connection port in an inward diagonal direction, i.e., likewise, at the angle θ of about to 50 degrees with respect to the horizontal reference line.

The inner blocking portion 54 and the outer blocking portion 53 may branch off from the end of the connection portion 52, become spaced apart from each other, and then extend in the diagonal direction so as to become parallel to each other sequentially.

That is, the inner blocking portion 54 extends first from the connection portion 52 at the angle θ of 40 to 50 degrees. The outer blocking portion further extends in the horizontal direction and then is bent at an angle θ1 of 40 to 50 degrees, such that the inner blocking portion 54 and the outer blocking portion 52 may be disposed in parallel with each other.

A length of the outer blocking portion 53 may be shorter than a length of the inner blocking portion 54. The length of the outer blocking portion 53 may be approximately 0.3 to 0.5 times the length of the inner blocking portion 54.

In case that the length of the outer blocking portion 53 is as long as the length of the inner blocking portion 54, there is a problem in that when the connection conductor 330 of the branch box 300 is repeatedly inserted, the shape of the outer blocking portion 53 may be deformed and opened because the contact with the connection conductor 330. Therefore, the length of the outer blocking portion 53 is set to be 0.5 times or less the length of the inner blocking portion 54 to minimize interference between the connection conductor 330 and the outer blocking portion 53, thereby suppressing deformation. In addition, because the inner blocking portion 54 having a long length is present inward, the exposure of the inside of the bus duct may be prevented even though the outer blocking portion 53 has a short length.

That is, the inner blocking portion 54 is longer than the outer blocking portion 53, such that the ends of the inner blocking portions 54 are in contact with each other to prevent the inside of the bus duct from being exposed in the state in which the branch box 300 to be described below is not mounted.

In this case, the mounting portion 51, the connection portion 52, the inner blocking portion 54, and the outer blocking portion 53 of the cover member 50 may be integrated by extrusion.

In addition, it is possible to apply a method of allowing the outer blocking portion 53 and the inner blocking portion 54 of the cover member 50 to have different thicknesses and a method of allowing the outer blocking portion 53 and the inner blocking portion 54 to have different materials for respective regions during the extrusion.

The outer blocking portion 53 and the inner blocking portion 54 may each have a thickness of 0.5 to 1.0 millimeters (mm).

More specifically, the inner blocking portion 54 may have a thickness of 0.5 to 0.8 millimeters (mm), and the outer blocking portion 53 may have a thickness of 0.8 to 1.0 millimeters (mm), such that the outer blocking portion 53 may be configured to be shorter but thicker than the inner blocking portion 54.

That is, because the outer blocking portion 53 is thicker than the inner blocking portion 54, it is possible to prevent the operator's finger from being inserted into the bus duct.

The cover member 50 may be made of a polymer material, particularly a PVC material. In case that the outer blocking portion 53 and the inner blocking portion 54 are made of different materials for respective regions, the outer blocking portion 53 may be made of hard PVC having a low extension ratio, and the inner blocking portion 54 may be made of soft PVC having a high extension ratio.

Polyvinyl chloride (PVC) is thermoplastic plastic that is easy to color, hard or flexible, and hardly abrasive.

In this case, the outer blocking portion 53 may be made of hard PVC having tensile strength of 550 to 610 kg/cm$^2$, specific gravity of 1.35 to 1.55 g/cm$^3$, and an extension ratio of 140 to 160%. The inner blocking portion 53 may be made of soft PVC having tensile strength of 170 to 210 kg/cm$^2$, specific gravity of 1.13 to 1.33 g/cm$^3$, and an extension ratio of 400 to 450%.

Therefore, the inner blocking portion 54, which is longer than the outer blocking portion, is made of a soft material to implement a soft motion or deform when the connection conductor enters the bus duct. Further, the inner blocking portion 54 may have a high elasticity and a small thickness, and the ends of the inner blocking portions 54 may be in contact with each other. Therefore, even though the branch box is repeatedly inserted and detached, plastic deformation does not occur, and restoration is possible, such that the ends of the two inner blocking portions 54 are deformed and restored so as to be in contact with each other in the state in which the branch box is separated from the bus duct. Therefore, the busbars and the like in the bus duct may not be observed visually. In contrast, the outer blocking portion 53, which is shorter than the inner blocking portion 54, is made of a relatively hard material having a low elasticity in order to prevent the penetration of foreign substances or a safety accident caused by carelessness insertion of the operator's finger. Further, the outer blocking portion 53 may have a relatively large thickness, and the ends of the outer blocking portions 53 are spaced apart from each other slightly before the branch box is mounted. Therefore, even though the connection conductor of the branch box is repeatedly inserted and detached, the shape of the outer blocking portion 53 may be maintained. Further, the outer blocking portion 53 may be in close contact with the connection conductor in a state in which the branch box is mounted, thereby providing the watertightness function or the like.

In case that the cover member 50 has a single blocking portion, the single blocking portion may initially prevent the physical approach of the finger or other metal objects and the visual exposure of the busbar or the like. However, it has been ascertained that the blocking portion made of a material such as plastic is deformed during the process of repeatedly mounting and detaching the branch box, and plastic deformation or permanent deformation, in which a gap between the blocking portions increases even though the branch box is detached, may occur. Therefore, the blocking portions include the outer blocking portion 53 and the inner blocking portion 54, and the outer blocking portion 53 and the inner blocking portion 54 have different thicknesses or are made of materials having different physical properties, such that the functions of the blocking portions may be distinguished.

The mounting portion 51 of the cover member 50 may be mounted by being slidingly inserted into a slot 17 formed in the enclosure, and the mounting portion 51 may be provided in the form of a bar. The connection portion 52 of the cover member 50 may extend to be inclined downward from the mounting portion 51 and then bent in the horizontal direction.

Further, the mounting portion 51 may branch off from the connection portion in a direction different from the direction of the connection portion so that the mounting portion 51 does not rotate in the state in which the mounting portion 51 is mounted by being inserted into the slot 17 of the enclosure. The mounting portion 51 may have a protrusion 51p being in surface contact with the slot 17.

Therefore, the inner blocking portion 54 and the outer blocking portion 53, which branch off from the end of the connection portion 52 diagonally in the direction toward the connection port, may be structured to approach each other.

Further, the thickness of the outer blocking portion 53 is larger than the thickness of the inner blocking portion 54, such that the outer blocking portion 53 may provide a physical blocking force to some extent to prevent the person's finger or metal objects other than the busbar from approaching the busbar.

Further, the lengths and shapes of the blocking portions may be determined so that in the state in which the branch box is not mounted, the ends of the pair of outer blocking portions 53 of the cover member 50 are spaced apart from each other, and the pair of inner blocking portions 54 are in contact with each other.

In case that the cover member 50 includes a single blocking portion having a sufficient thickness, and the ends of the blocking portions, which face each other, are configured to be in contact with each other, it is possible to prevent a part of the body such as the finger from being inserted into the connection port because of the operator's carelessness. However, when the branch box is repeatedly mounted and detached, the blocking portion is plastically deformed without being restored to the original shape because of physical properties such as the tensile strength and extension ratio of the blocking portion of the cover member 50 of the bus duct even in the state in which the branch box is not mounted, which may cause a problem in that the gap between the blocking portions of the cover members 50 increases.

Therefore, the cover members 50 of the bus duct according to the present disclosure have the outer blocking portions 53 having a large thickness, and the outer blocking portions 53 are not in contact with each other even in the state in which the branch box is not mounted, such that when the connection conductor 330 enters the connection port, the interference with the connection conductor 330 may be minimized, thereby preventing the occurrence of plastic deformation of the outer blocking portion 53.

In contrast, the inner blocking portion 54 of the cover member 50 has a small thickness and is made of a material that is softer than the material of the outer blocking portion 53 and has relatively low tensile strength and a relatively large extension ratio, such that the ends of the inner blocking portions 54 are configured to be in contact with each other. Therefore, the busbar or the like may be prevented from being visually exposed, and the inner blocking portion 54 is not plastically deformed even though the connection conductor is repeatedly mounted or detached, such that the shape of the inner blocking portion 54 may be maintained, and the blocking function may be maintained.

In addition, when the outer blocking portion 53 is thicker and shorter than the inner blocking portion 54, it is possible to ensure an advantage in that substantial cross-sectional areas are close to each other, and the extrusion characteristics may be ensured.

Figure 6:
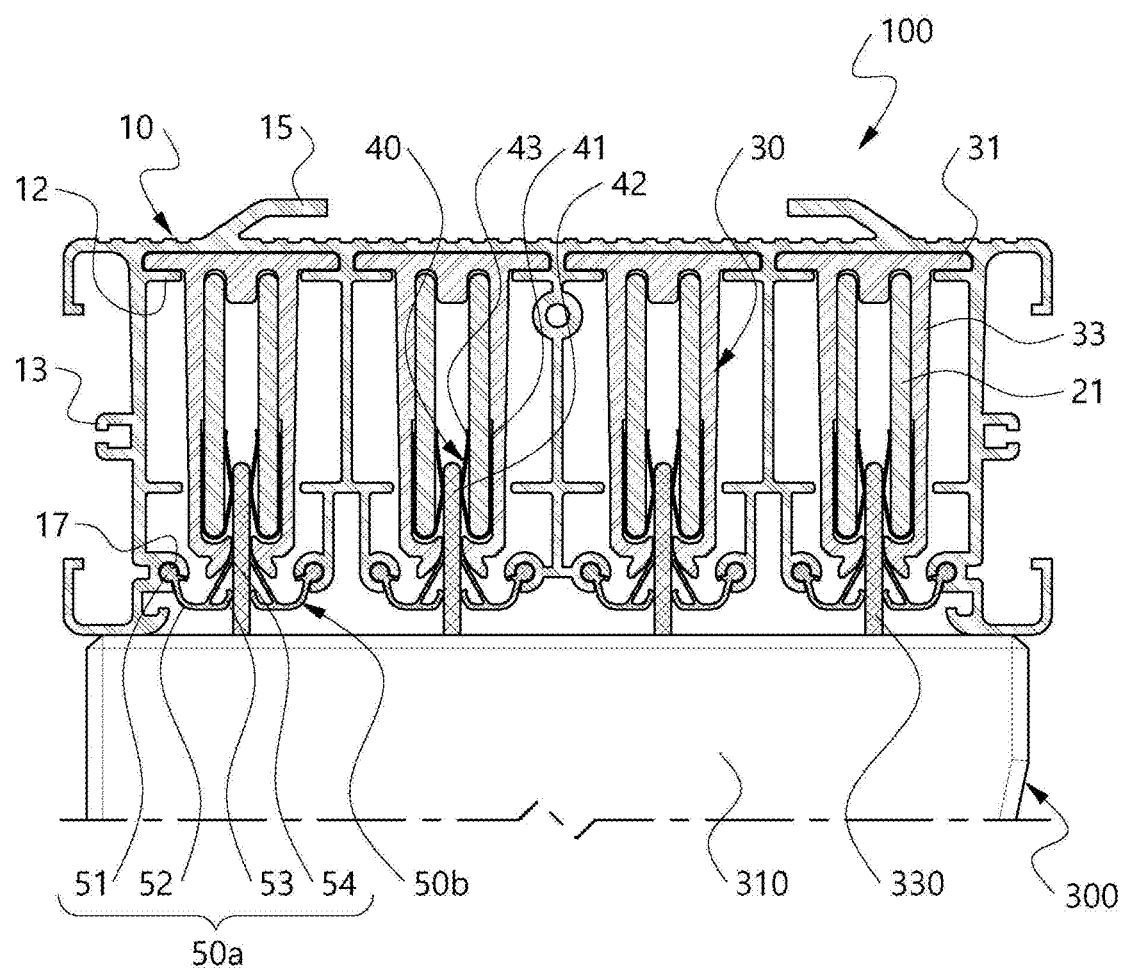

FIGS. 5 and 6 illustrate cross-sections during the process of connecting the bus duct 100 and the branch box 300 of the present disclosure.

The state illustrated in FIG. 5 is a state made before the branch box 300 is connected to the bus duct 100. The branch box 300 has the plurality of connection conductors 330 protruding upward from a housing 310. The connection conductors 330 for respective phases may be configured as plate-shaped conductors. The plate-shaped connection conductor 330 may be inserted between the elastic contact members 40 respectively mounted on the pair of busbars 21 and supply power.

In addition, although not illustrated in FIG. 5, at least one plug connection unit, on which a plug of a power cable for supplying power to a power-consuming facility, is provided on a lateral or bottom surface of the housing 310 of the branch box 300, such that the general power cable may be connected to the power-consuming facility.

As illustrated in FIG. 6, when the branch box 300 is mounted on the bus duct 100, the connection conductor 330 moves to the portion between the cover members 50 at the lower side of the branch box 300 and enters the connection port 70 of the bus duct 100.

As described above, the two cover members 50 mounted on the lower portion of the bus duct 100 are disposed side by side in the longitudinal direction of the bus duct 100 in order to block one connection port. When the connection conductor enters the cover members 50, the connection conductor primarily separates the ends of the outer blocking portions 53 of the cover members 50, and then the connection conductor enters the connection port while separating the ends of the inner blocking portions 54.

As described above, the outer blocking portions 53 of the cover member 50 have a sufficient thickness and are spaced apart from each other so that the amount of deformation is small. Therefore, even though the connection conductor is repeatedly mounted and detached between the outer blocking portions 53, the outer blocking portions 53 of the cover members 50 may be prevented from being plastically deformed.

The connection conductor, which has entered between the outer blocking portions 53 while separating the outer blocking portions 53, enters the connection port by separating the inner blocking portions 54 in a similar way and then is mounted between the elastic contact portions of the elastic contact members 40, such that the connection may be completed.

The elastic contact portions of the elastic contact members 40 elastically support the two opposite surfaces of the connection conductor of the branch box, such that the electrical connection between the busbars and the connection conductor may be completed.

In order to separate the branch box in the state in which the branch box is mounted on the bus duct illustrated in FIG. 6, the connection conductor of the branch box is separated from the portion between the elastic contact portions 42 of the pair of elastic contact members while sequentially separating from the inner blocking portions 54 and the outer blocking portions 53. In this case, the two opposite ends of the inner blocking portions 54 may be restored to be in contact with each other, and the two opposite ends of the outer blocking portions 53 may also be restored to the original locations, thereby improving the reliability and durability of the physical blocking function and the visual blocking function of the cover members 50.

Figure 7:
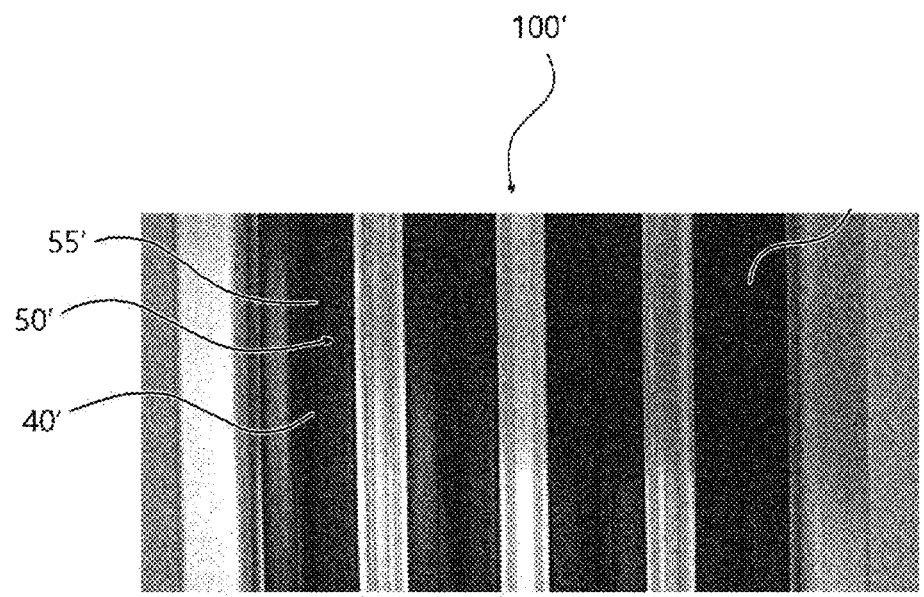
FIG. 7 is a photograph of a bottom surface of a bus duct in the related art.
Figure 8:
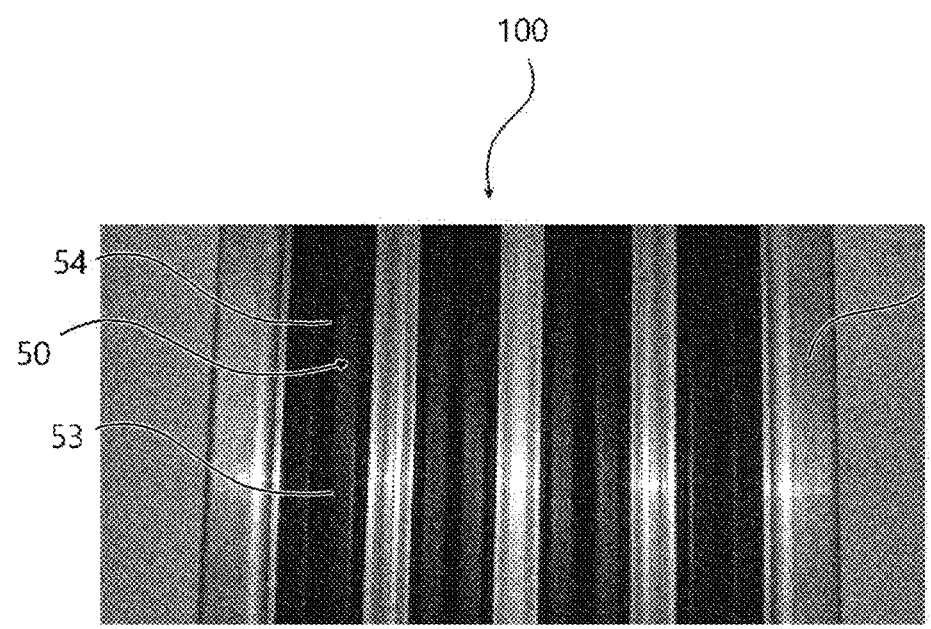
FIG. 8 is a photograph of a bottom surface of the bus duct according to the present disclosure.

FIG. 7 is a photograph illustrating a bottom surface of a bus duct in the related art, and FIG. 8 is a photograph illustrating a bottom surface of the bus duct according to the present disclosure.

Even in the case of the bus duct 100' in the related art illustrated in FIG. 7, a plurality of pairs of cover members 50' having blocking portions is mounted at lower sides of connection ports of the branch box.

The cover member 50' of the bus duct 100' in the related art has a blocking portion 55' to prevent the exposure of the busbar or the introduction of foreign substances. However, the blocking portion may be configured as the single blocking portion 55' without having a structure branching inward and outward.

In the case of the bus duct in the related art, when the branch box is repeatedly installed and detached, the blocking portion 55' of the cover member 50' is plastically deformed, as illustrated in FIG. 7, and the blocking portion 55' is opened. For this reason, the inside busbar or the elastic contact member 40' may be exposed even when the branch box is separated from the bus duct.

The cover member 50' in the related art is designed to block the connection port in the state in which the branch box is not mounted. However, the blocking portion 55' of the cover member is hard and has a large thickness, which causes a problem in that the blocking portion 55' is plastically deformed without being restored in shape even when the connection conductor of the branch box is separated.

For this reason, foreign substances such as dust may be introduced into a gap in the blocking portion 55' of the cover member, and the issues may be raised about the reliability or durability of the product in terms of the appearance.

In contrast, the outer blocking portion 53 and the inner blocking portion 54 of the cover member 50 of the bus duct 100 according to the present disclosure illustrated in FIG. 8 have different thicknesses and lengths and are made of materials having different physical properties. Therefore, the amount of deformation of the outer blocking portion 53, which is relatively thick, is not large during the process of mounting the branch box, the original shape of the outer blocking portion 53 may be easily maintained even when the branch box is separated, such that the approach of the operator's finger or an object having a large size may be prevented. Further, the inner blocking portion 54 having a relatively small thickness is easily restored in shape without being deformed in shape even after the connection conductor of the branch box is separated. Therefore, it can be ascertained that the connection port of the bus duct is blocked, which may prevent the introduction of dust or the like and prevent the problem of the exposure of the busbar or the like.

Figure 9:
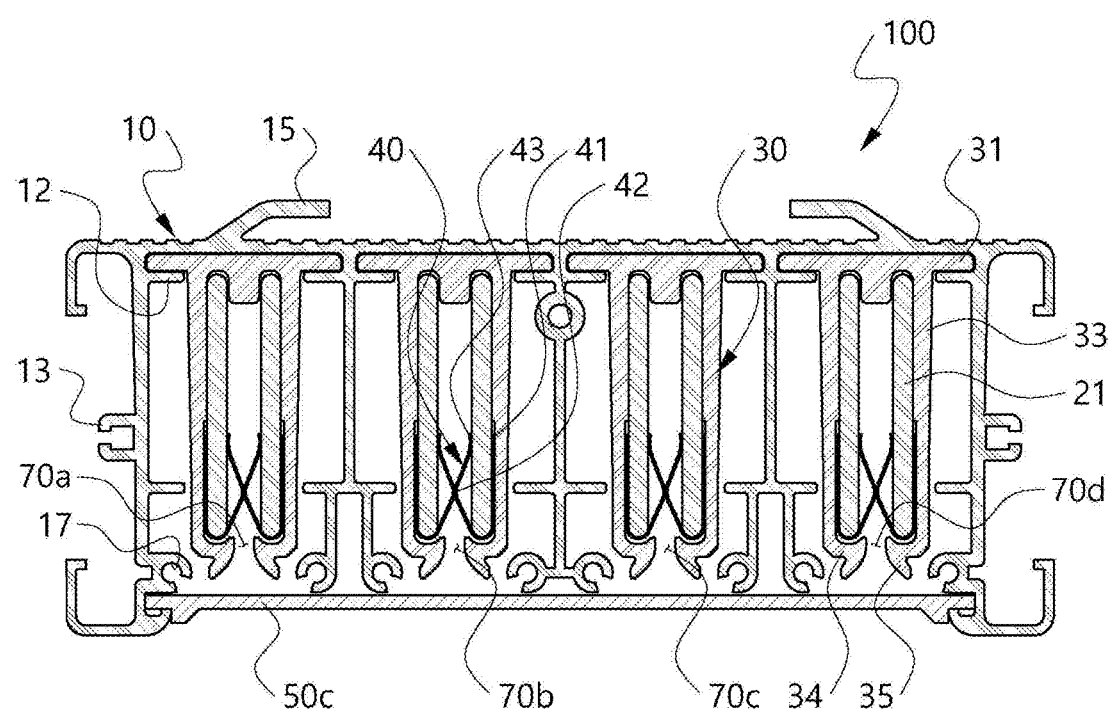
FIG. 9 is a view illustrating another embodiment of the bus duct according to the present disclosure.

FIG. 9 illustrates another embodiment of the bus duct 100 according to the present disclosure. In the bus duct 100 according to the embodiment described above with reference to FIGS. 4 to 6, the cover members 50, which are configured to prevent the exposure of the elastic contact members 40 and the conductors constituting the busbars 21, are mounted in the entire region in the longitudinal direction of the bus duct 100, and the branch box 300 is mounted at any location.

The bus duct 100 illustrated in FIG. 9 also has cover members 50c for preventing the exposure of the elastic contact member 40 and the conductors constituting the busbars 21. However, the cover member 50c according to the embodiment illustrated in FIG. 7 is provided in the form of a board.

Therefore, in order to mount the branch box 300, the cover member 50c of the bus duct 100, which is disposed at the mounting location of the branch box 300 among the plurality of bus ducts 100 connected by the connection kit 200, may be removed, and then the branch box 300 may be mounted.

The cover member 50 may be configured as the cover member 50c provided in the form of a single sheet of board to cover the entire lower portion of the single bus duct 100. Alternatively, the plurality of cover members 50 having the above-mentioned shape may be separated to cover the lower portion of the single bus duct 100.

That is, the bus duct illustrated in FIG. 9 may be installed in a general section of the data center described with reference to FIG. 1, and the bus duct illustrated in FIGS. 4 to 6 may be installed in a region in which the branching using the branch box is required.

In addition, because the bus duct illustrated in FIGS. 4 to 6 and the bus duct illustrated in FIG. 9 may be connected by means of the connection kit illustrated in FIGS. 2 and 3, the bus ducts may be changed for each region in response to various environments, thereby providing various degrees of freedom for the power system.

While the present disclosure has been described above with reference to the exemplary embodiments in the present application, the present disclosure may be variously modified and changed by those skilled in the art without departing from the spirit and scope of the present disclosure disclosed in the claims. Accordingly, when the modified embodiments basically include the components of the claims of the present disclosure, it should be considered that the modified embodiments belong to the technical scope of the present disclosure.

The invention claimed is:
1. A bus duct comprising:
an enclosure made of a metallic material;
a plurality of pairs of busbars disposed in pairs in parallel with one another in a longitudinal direction of the enclosure and spaced apart from one another;

a plurality of insulation members configured to mount the plurality of pairs of busbars in an insulated state in the enclosure; and a plurality of pairs of cover members mounted on a lower portion of the enclosure and configured to prevent exposure of the plurality of pairs of busbars, wherein the plurality of pairs of cover members are mounted on the enclosure to block connection ports of the bus duct into which connection conductors of a branch box are inserted, and the plurality of pairs of cover members are deformed inward to expose connection ports when the connection conductors of the branch box enter the connection ports, wherein a cover member of the plurality of pairs of cover members comprises a mounting portion mounted on the enclosure, a connection portion extending from the mounting portion toward a lower side of a connection port of the connection ports, and a plurality of blocking portions branching off from the connection portion in a direction toward the connection port, and wherein the plurality of blocking portions of the cover member of the plurality of pairs of cover members comprises an outer blocking portion extending from the connection portion, and an inner blocking portion extending from the connection portion toward an inside of the bus duct further than the outer blocking portion.

2. The bus duct of claim 1, wherein the outer blocking portion further extends from the connection portion in a horizontal direction and then is bent in a direction toward the connection port.

3. The bus duct of claim 1, wherein the mounting portion, the connection portion, the inner blocking portion, and the outer blocking portion of the cover member are integrated by extrusion.

4. The bus duct of claim 1, wherein a physical property of a material of the outer blocking portion is different from a physical property of a material of the inner blocking portion.

5. The bus duct of claim 4, wherein the outer blocking portion has tensile strength of 550 to 610 kg/cm2, specific gravity of 1.35 to 1.55 g/cm3, and an extension ratio of 140 to 160%.

6. The bus duct of claim 4, wherein the inner blocking portion has tensile strength of 170 to 210 kg/cm2, specific gravity of 1.13 to 1.33 g/cm3, and an extension ratio of 400 to 450%.

7. The bus duct of claim 4, wherein the outer blocking portion is made of a hard PVC material, and the inner blocking portion is made of a soft PVC material.

8. The bus duct of claim 1, wherein a thickness of the outer blocking portion is larger than a thickness of the inner blocking portion.

9. The bus duct of claim 8, wherein the outer blocking portion and the inner blocking portion each have a thickness of 0.5 to 1.0 millimeters (mm).

10. The bus duct of claim 9, wherein the inner blocking portion has a thickness of 0.5 to 0.8 millimeters (mm), and the outer blocking portion has a thickness of 0.8 to 1.0 millimeters (mm).

11. The bus duct of claim 1, wherein the outer blocking portion is shorter than the inner blocking portion.

12. The bus duct of claim 11, wherein a length of the outer blocking portion is 0.3 to 0.5 times a length of the inner blocking portion.

13. The bus duct of claim 1, wherein in a state in which the connection conductors of the branch box are not inserted into the connection ports, respectively, the outer blocking portion of the cover member is not in contact with an opposite outer blocking portion, and a predetermined interval between outer blocking portions is maintained.

14. The bus duct of claim 13, wherein the predetermined interval between the outer blocking portions is smaller than a thickness of the connection conductors conductor of the branch box.

15. The bus duct of claim 1, wherein in a state in which the connection conductors of the branch box are not inserted into the connection ports, respectively, ends of inner blocking portions of the plurality of pairs of cover members are in contact with each other and block the connection ports.

16. The bus duct of claim 1, wherein the inner blocking portion and the outer blocking portion sequentially branch off from the connection portion at an angle of about 40 to 50 degrees with respect to a horizontal reference line.

17. The bus duct of claim 1, wherein the mounting portion of the cover member is mounted by being slidingly inserted into a slot formed in the enclosure.

18. The bus duct of claim 17, wherein the mounting portion of the cover member includes a protrusion branching off from the connection portion in a direction different from a direction of the connection portion so that the mounting portion does not rotate in a state in which the mounting portion is mounted in the slot of the enclosure.

19. The bus duct of claim 1, wherein the connection portion of the cover member has a shape extending to be inclined downward from the mounting portion and then bent in a horizontal direction.

20. A bus duct system comprising:
the bus duct according to claim 1; and
wherein the branch box comprises:
  a housing,
  the connection conductors which are connected and inserted into the connection ports of the bus duct and protrude upward from the housing, and
  at least one plug connection unit on which a plug of a power cable is mounted, wherein the power cable is configured for distributing power, which is supplied through the connection conductors, to a power consuming facility.

* * * * *